United States Patent [19]

Jaskulke et al.

[11] 3,717,723

[45] Feb. 20, 1973

[54] PROCESS AND APPARATUS FOR THE SELECTION AND INTERROGATION OF CONNECTIONS IN DIAL EXCHANGE DATA SYSTEMS WITH CENTRAL PROGRAMABLE CONTROL

[75] Inventors: Gerhard Jaskulke, Munich; Max Mayer, Unterpfaffenhofen; Bernt Lampe; Fritz Giebler, both of Munich; Hasso Steigenberger, Unterhaching, all of Germany

[73] Assignee: Siemens Aktiengesellschaft, Berlin and Munich, Germany

[22] Filed: Sept. 14, 1970

[21] Appl. No.: 71,675

[30] Foreign Application Priority Data

Sept. 12, 1969 Germany....................P 19 46 389.9

[52] U.S. Cl.....................................................178/3

[51] Int. Cl..............................................H04l 11/00

[58] Field of Search..................................178/3, 2 R

[56] References Cited

UNITED STATES PATENTS

| | | | |
|---|---|---|---|
| 3,403,383 | 9/1968 | Kienzle et al. | 178/2 R |
| 3,531,772 | 9/1970 | Dalyai et al. | 178/3 |
| 3,469,021 | 9/1969 | Dahlblom et al. | 178/3 |
| 3,522,587 | 8/1970 | Brown, Jr. | 178/3 |

*Primary Examiner*—Thomas W. Brown
*Attorney*—Birch, Swindler, McKie & Beckett

[57] ABSTRACT

A process and apparatus are described for the exchange of pulse coded messages between connections in line connection units in dial exchange data systems having programable, central control means, wherein connections are established between incoming and outgoing connections according to the principle of request and proceed to send. The connections are made utilizing data and programs contained in a central storage means. Input code transducers are provided for identifying incoming connections, e.g. from transmitters, and output code transducers are provided for identifying and addressing outgoing connections, e.g. to receivers. The selection of incoming connections, i.e. those transmitting requests, for example polarity changes, takes place using binary address information and said selection is determined by an input code transducer in the known manner. The same principle is used for addressing a storage cell in the central store assigned to the incoming connection and selecting the outgoing connection using an output code transducer. Simultaneously with the foregoing selection process, further operation modes, for example polarity interrogation, setting back, transmitting and re-poling, can be carried out through a logical connection of the address information over the appropriate connection by means of a signal indicating the desired one of said modes of operation.

11 Claims, 6 Drawing Figures

PROCESS AND APPARATUS FOR THE SELECTION AND INTERROGATION OF CONNECTIONS IN DIAL EXCHANGE DATA SYSTEMS WITH CENTRAL PROGRAMABLE CONTROL

BACKGROUND OF THE INVENTION

The invention relates to a process and apparatus for the exchange of pulse coded communications between connections within a line connection unit of a dial exchange data system, having central, programable control means and under the influence whereof connections between incoming and outgoing connections (transmitters, receivers) are established according to the principle of request and "proceed to send" utilizing data and programs contained in a central store means. By this means, the identification of incoming connections (transmitters) takes place in a input code transducer, and the identification of outgoing connections (receivers) takes place in an output code transducer.

In a known dial exchange data system a central control e.g. a special purpose computer, processes all changes in binary communications, i.e. it detects the polarity changes appearing on incoming connections, and effects, by reason of an information located in a central store or memory bank about the outgoing connection, the transmission of the polarity change to a desired outgoing connection.

The principle of such a dial exchange data system is illustrated in FIG. 1, and it will be useful, at this point, to describe the FIG. 1 system. Incoming connections on so-called transmitter lines ZL and outgoing connections on so-called receiver lines AL are connected to a line connection until LE. The latter contains a system connection unit SAE, a code transducer CW with input code transducer ECW and output code transducer ACW, as well as a transmission program control UEAS. By means of a control channel StK and a data channel D*k*, the line connection unit LE has access to a central store S, which in turn contains a core store KS and store control systems SOPS and SAFS.

Each change in a binary communication is conveyed to central store S and is there recorded in a storage cell assigned to the particular transmitter. However, it is also available in the transmission program control UEAS and can be transmitted from there, with the aid of the receiver address supplied by central store S, to the desired receiver. This traffic of the line connection unit LE with the central store S takes place according to the principle of request and proceed to send. The identification of requesting transmitters, i.e. of transmitters emitting a polarity change, takes place in input code transducer ECW which seeks the transmitter in question and transmits the address thereof in binary code to transmission program control UEAS. From there, a memory cell in the central store assigned to the transmitter is approached in a manner which it is not necessary to describe. By reason of the dial information transmitted by a transmitter, which dial information is communicated to the central store, information is available there about the desired receiver during the entire duration of the connection. For the purpose of switching the change, the communication between transmitter and receiver, there is conveyed to output code transducer ACW, over transmission program control UEAS, the address of the desired receiver in binary form. Thus the retransmission of a polarity exchange which arrives on an incoming line occurs in a manner such that the respective outgoing line is searched with the aid of the address which is read from the memory and the new polarity is retransmitted over this line. After the decoding of the binary address in output code transducer ACW, whereby, at the same time, the desired receiver is determined, the change in condition of the binary signal, as announced by the transmitter, i.e., the polarity change, is transmitted to the receiver.

Thus, in code transducer CW there always proceeds a line finding, as well as operation processes. In a first finding process all transmitters, offering requests in the form of polarity changes, are identified. In a second finding process the transmitters are interrogated in an interrogation operation. The findings as well as the interrogation-process, are carried out by input code transducer ECW. Thirdly, the receiver, to which a change in state must be conveyed, is determined in a third finding process over the output code transducer ACW by reason of the address contained in the store. Finally, the change in state in question is transmitted to the receiver that was determined in a transmission operation.

In order to find and to identify a plurality of lines within a short period of time it has already been suggested to carry out the finding processes according to a finding chain principle.

It is, therefore, an object of this invention, which also concerns such a dial exchange data system, to simplify the switching requirements connected with the finding and operating processes in the code transducer due to the system.

SUMMARY OF THE INVENTION

This and other objects are achieved according to the invention through the fact that the selection of arriving connections from transmitters offering requests, for example polarity changes, takes place by utilizing address information, determined through the input code transducer in a manner known per se, which information is used for the addressing of a storage cell in the central store assigned in each case to the transmitter. The same process is used for the selection of the outgoing connection to receivers through the output code transducer. Simultaneously with a selection process further operations can be carried out through a logic connection of the address information of the appropriate connection with a desired mode of operation ("information interrogation," for example polarity interrogation, setting back, transmitting, re-poling).

If one proceeds according to the invention, already through the fact that the output code transducer not only serves for the transmission of information for outgoing connections thru the mode of operation, but also for the selection and interrogation of the polarities (by means of the operational mode of polarity interrogation) on the incoming connections, a considerable simplification of the code transducer is achieved. Because simultaneously with the selection, other operational modes can be connected, a further simplification of the program of the system and thereby also a simplification in the development of the code transducer is achieved. Such additionally possible modes of operation are, for example, the mode of operation of "setting back" by which a system connection unit is set to the state existing after a polarity change on an incoming connection, or the mode of operation of "re-poling," necessary for an outgoing single-current connection. In addition the invention permits further simplification in the supervision of the system connections, as well as the mode of operation of the code transducer.

BRIEF DESCRIPTION OF THE DRAWINGS

The invention will be best understood by reference to the description of a preferred embodiment and a preferred form of the process given hereinbelow in conjunction with the drawings in which.

DETAILED DESCRIPTION OF THE DRAWINGS

Figure 1:
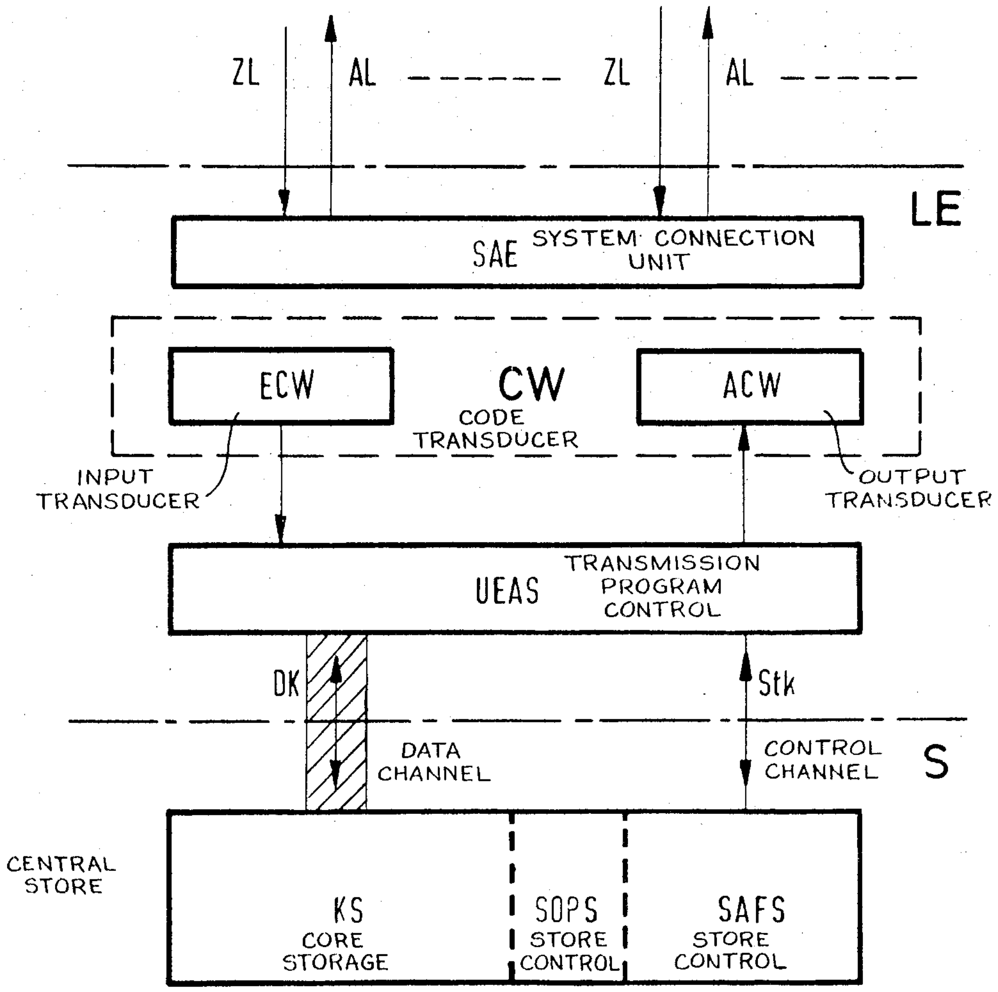
FIG. 1 is a block diagram illustrating the dial exchange data system for which this invention provides improvements (this figure is described hereinabove)
Figure 2:
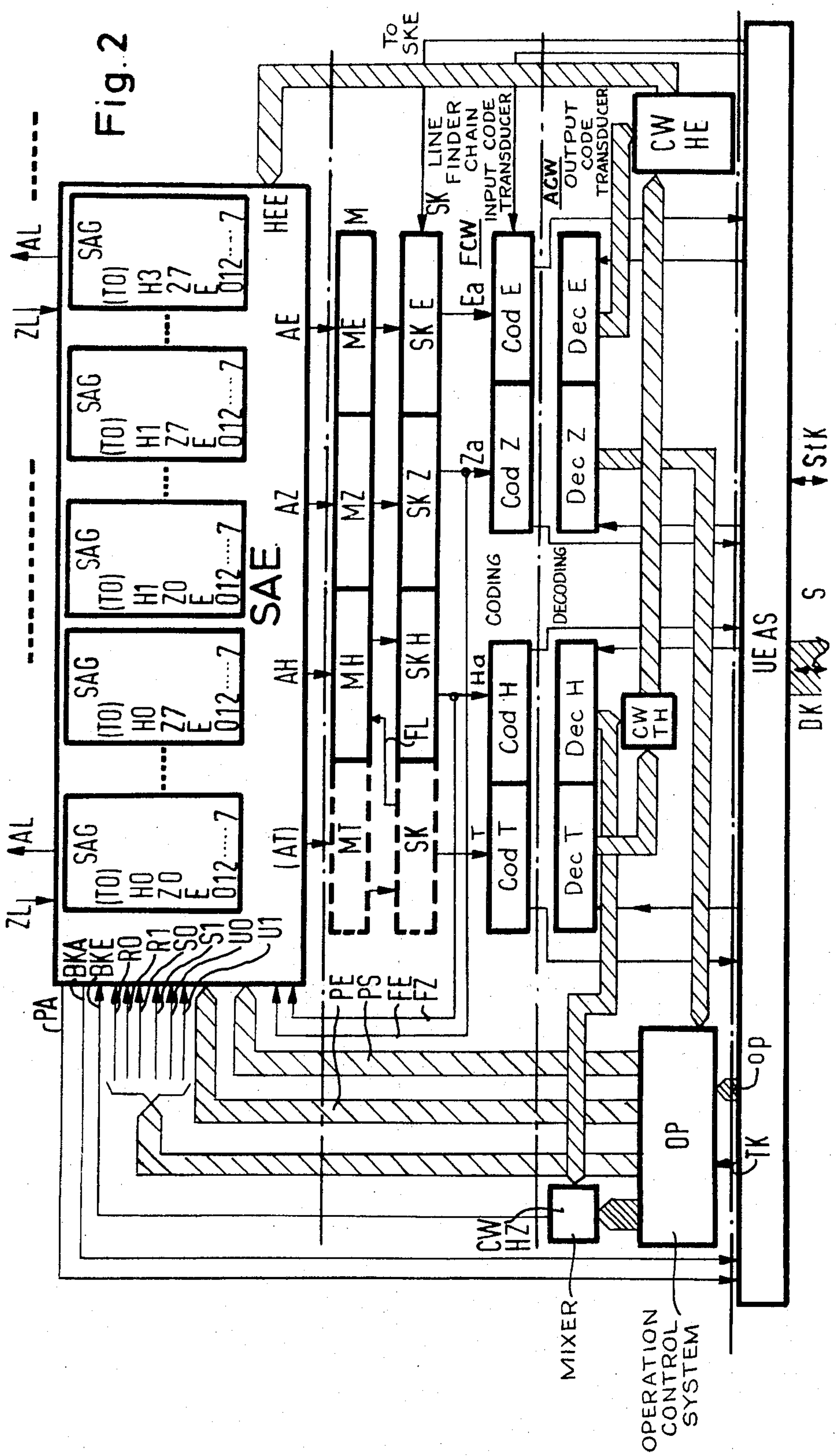
FIG. 2 is a block diagram of a preferred system similar to that in FIG. 1, but constructed and having a mode of operation according to the principles of this invention.

The preferred embodiment shown in FIG. 2 in the form of a block circuit diagram contains in its upper portion the system connection unit designated by SAE, within which the system connections, combined into groups SAG and assigned in each case to the individual incoming and outgoing connections ZL and AL, are arranged. System connection unit SAE has access, over outlets AT, AH, AZ and AE, which shall be considered later, to input code transducer ECW. The latter contains essentially a mixing stage M, consisting of a series of mixer circuits MT, MH, MZ and ME, and a series of line finder chains SK, over the outlets T, H, Z and E of which, the result of a finding process is transmitted to a coding system Cod. The result, converted in the coding system into a binary information, is forwarded to transmission program control UEAS and is available there for a further processing in central store S. In FIG. 2 this is only indicated by the data- and control-channel DK and StK, which, although not shown, continue on to the store.

Output code transducer ACW contains essentially a decoding system Dec, which is supplied, over transmission program control UEAS, with informations from the store. The central store makes possible the approaching of a desired receiver AL. To perform according to the principles of the invention the output code transducer ACW contains an operation control system OP which is in connection, in a manner to be described later, with system connection unit SAE, as well as further mixer circuits CWTH, CWZ, CWE and CWHE which also interact in a specific manner, to be described later, with the system connection unit SAE.

However, it is also possible, within the framework of the invention, to connect each of the modes of operation with the complete, decoded address, for example directly to a system connection. In this case, however, the operation control could be eliminated.

Because the combination of the system connections in the system connection unit SAE, as well as the finding process in input code transducer ECW are not the object of this invention, a description of the therewith connected processes is deemed necessary only insofar as it is required for the understanding of the invention.

In the preferred embodiment of FIG. 2 a four-digit octal code has been selected to identify the connections connected to the system, i.e., a maximum of $8^4 = 4,096$ connections can be connected to the system. The invention is, of course, not restricted to this code. In FIG. 2 the individual digits of the selected code have been designated, for reasons of clarity, by thousands T, hundreds H, tens Z and ones E. It shall further be pointed out that the working example of FIG. 2 contains only a part of the 4096 system connections which can be connected in the finished construction, i.e. those of the thousand group TO, of the hundred groups H0 to H3, of the ten groups Z0 to Z7 and of the one groups EO to E7. For this reason in the system connection groups SAG of FIG. 2 the thousands T have in each case been placed in parentheses. In a system connection group SAG in each case the system connections of an equal 10 are combined. Accordingly within a hundred group there are in each case eight system connection groups SAG, i.e. for Z0, Z1 etc. to Z7. Within a system connection group SAG the system connections assigned to the individual one positions EO to E7 are combined. Switching details of a system connection groups are described later with the aid of FIG. 3.

Corresponding to the selected code the system connection unit SAE possesses four outputs AT (for thousands), AH (for hundreds), AZ (for tens) and AE (for ones), whereby due to the partial development of the working example of FIG. 2 the output AT is again placed in parentheses. In input code transducer ECW the individual outputs of the system connection unit SAE are mixed in a mixer circuit M. In the case being described where one proceeds from the fact that to all connections in each case the same thousand TO is given, this can be done in the manner that the outputs AH, corresponding to the connections of the same hundred, are combined in each case by eight system connection groups SAG. Accordingly, for the partial development shown in FIG. 2 four outputs AH, i.e. for H0, H1, H2 and H3 are to be combined in the mixer circuit MH for hundreds. For an expansion of the system to a greater number of connections there easily exists the possibility of providing further mixer circuits. For this case the outputs AT, in each case assigned to a thousand group, would also be switched. It would further also be necessary to combine in each case the same hundreds of different thousand groups, which could, for example, take place in further mixer circuits of mixer stage M. Similarly, to the hundred-outputs AH, outputs AZ and AE are also combined in the mixer circuits MZ and ME. As a result of these mixing processes, each transmitter offering a request is identified in each case by a marked output of the individual mixer circuits MT, MH, MZ and ME. In the working example of FIG. 2 this could be one of the four outputs of mixer circuits MH and in each case one of the eight outputs of mixer circuits MZ and ME.

A line finder chain SK is assigned to each code digit which in FIG. 2 is designated by SKT (for thousand), SKH (for hundred), SKZ (for ten) and SKE (for ones). Finder chain SKT is, again, in parentheses due to the partial development.

This arrangement, described above, for the identification, for example, of transmitter lines, marked by requests, over mixer circuit M and finder chains SK, however, is not the object of this invention. Such a finding process can, for example, take place in the manner described in British patent 1,164,954. The finding principle described in the aforementioned patent operates with a number of finder chains determined by the number of digits of the selected code. In the selected example herein these are finder chains SKT, SKH, SKZ and SKE. The inputs of the individual finder chains are provided with a marking potential in each case only after the finder chain of higher value in each case has terminated the finding process. This is indicated in the working example of FIG. 2 by the fact that the finder chain SKT, actually not necessary in the selected partial development, causes the release of the outputs of mixer circuit MH over release line FH, and thereby initiates the finding process of finder chain SKH. The release of the finding process in finder chains SKZ, or SKE takes place in dependence on a signal indicating the termination of a finding process, which in the first instance reaches, over an input FZ, in each case all system connection groups with the previously determined equal thousand-hundred combination, or in the second instance, over an input FE, the system connection groups determined by the previously ascertained thousand-hundred-ten combination. As a result of the finding process, there is available a signal in each case to an output of the finding chains SKT, SKH, SKZ and SKE present per digit of the selected code. In the example of FIG. 2 there appears, as a prerequisite, in each case a signal at output H*a*, Z*a* and E*a* of finder chains SKH, SKZ and SKE. In code systems Cod a binary address signal is formed out of this information by which address signal the transmitter offering the request is determined and conveyed to transmission program control UEAS. In a manner for which a description is not needed herein a storage cell, assigned to the transmitter, in the central store is approached with this address.

Figure 3:
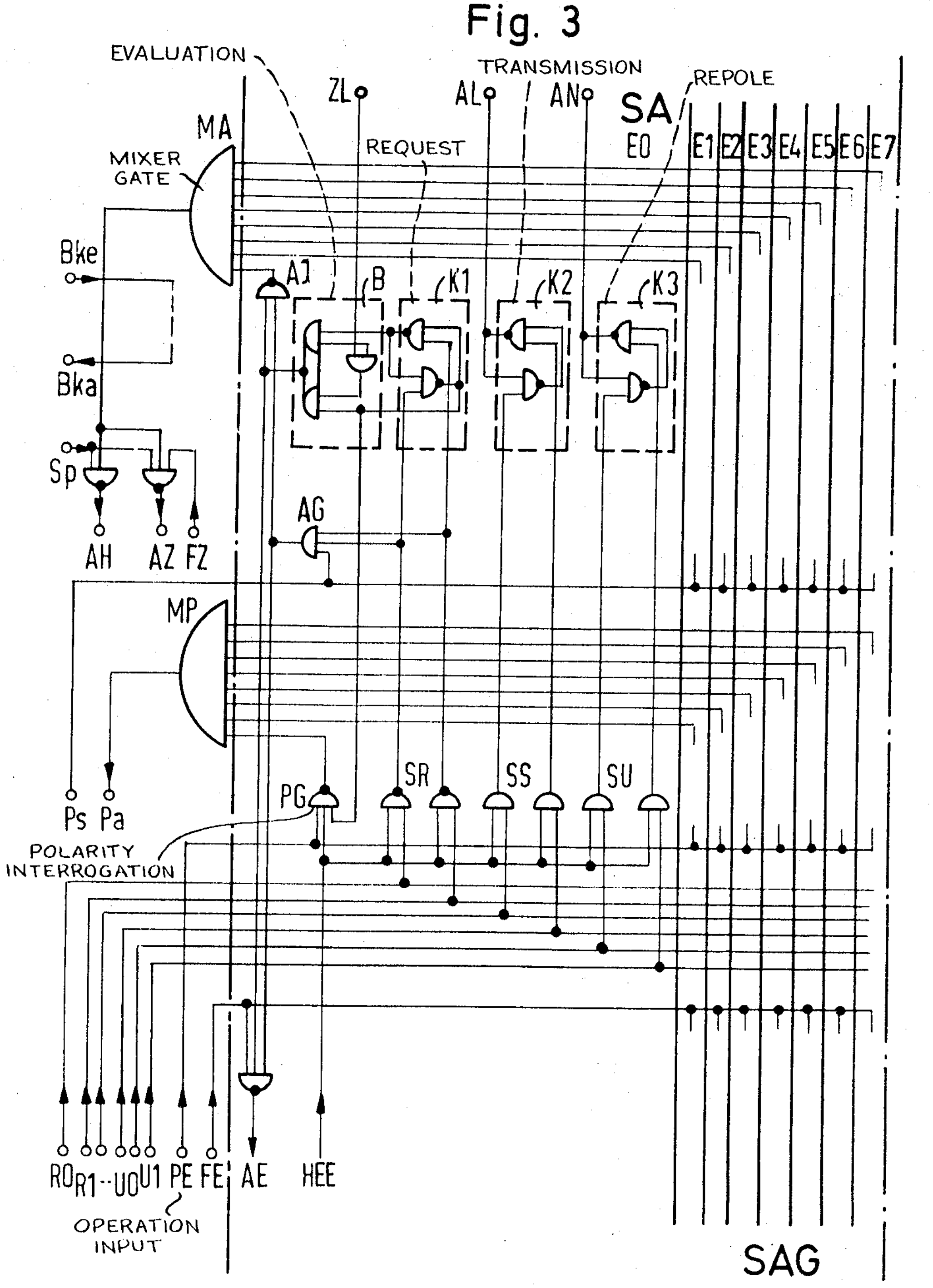
FIG. 3 is a schematic diagram of the circuitry of a portion of the system shown in FIG. 2.

According to the invention, the following processes, i.e. the selection of the offering transmitter, necessary for interrogation, and the operations necessary for further processing, or switching of the change in message, i.e. the polarity change, are controlled with the aid of output code transducer ACW, because the operation commands emanating from the transmission program control UEAS are processed with the addresses of the connections in question, said addresses being contained in the central store and transmitted over the transmission program control UEAS in binary form. According to the invention, operation control OP is provided and is connected with the appropriate outputs of the decoding system Dec of the output code transducer ACW. The mixer circuit CWTH is a matrix circuit, the lines and columns of which are connected with the outputs of decoding systems DecT and DecH. The decoding system forms out of the binary address information an address in a "1 out 8" code, corresponding to the thousands T and hundreds H. The outputs of the mixer circuit CWTH, delivering a signal corresponding to a thousand-hundred combination are connected with one input of the mixer circuit CWHE, the other inputs of which are connected with the outputs of the decoding system DecE. The mixer circuit CWHE is also a matrix circuit, delivering an identification signal in each case for the same ones of a hundred group. This identification signal is available to system connection unit SAE and thereby, as can be seen in FIG. 3, to all system connections SA having this hundred-one-combination, at input HEE. The further selection takes place through connection of the appropriate kind of operation with the remaining address information. The latter is the information indicating the 10-digit within the code selected for the connections.

In the example of FIG. 2 seven modes of operations are shown. These are the operations "polarity interrogation P*e*," "Setting back RO, R1," "Transmission SO, S1," and "Re-Poling U0, U1." These operations will now be described in detail.

The mode of operation "polarity interrogation P*e*" which reaches, over input PE, the system connection unit, causes the transmission of the polarity of an offering transmitter from the system connection unit. For this purpose there is available in system connection unit SAE on one hand the identification signal over input HEE and on the other hand the operation command for polarity interrogation mixed with the address portion corresponding to the 10-digit of the code.

The entire address of the transmitter offering a request, i.e. a polarity change, was previously transmitted, in a manner described, to transmission program control UEAS. Over outlet PA the polarity of the interrogated transmitter reaches transmission program control UEAS, from there it is communicated to the part of the central store assigned to the selected transmitter. With the aid of FIG. 2 one recognizes that operation control system OP possesses separate conductors to operation inlets R0, R1, S0, S1, U0 and U1 on one hand, and to operation input PE on the other hand. This is advantageous in that the operation mode "-polarity interrogation P*e*" can proceed independently from the synchronization T*k* of the system supplied by the central control system. Accordingly, the polarity interrogation takes place solely through the transmission of the address of the system connection SA to be interrogated. It shall be pointed out here, however, that according to this principle not only the information about the polarity change, i.e., an information comprising one bit, but also information comprising several bits can be interrogated. After the polarity interrogation, the system connection assigned to the interrogated transmitter, must be set back to the new polarity of the transmitter, in order to be able to recognize a later arriving new polarity change. This takes place over the operation inputs designated by R0 and R1, over which an information, formed of the mixture of the operation mode "setting back" with the address part corresponding to the 10-digit of the address code, is available. Because, at the same time, the said identification signal is again supplied over input HEE, the transmitter offering the request and previously interrogated is clearly determined. Thereby by the operation mode "setting back R1," or "setting back RO" a setting back to a condition corresponding to the logical "0," or the logical "1" is suggested.

The carrying out of the mode of operation "transmitting" is also effected in the described manner. For this purpose the operation inputs SO (for the transmission of an information, corresponding to the logical "0") and S1 (for the transmission of an information corresponding to the logical "1") are available. For this process, however, not the address of the requesting transmitter, but the address of the desired receiver is required. Because the desired receiver address, however, is also present in binary form in the central store and is available, over transmission program control UEAS, to output code transducer ACW, it can be carried out according to the same principle. The mode of operation "repoling," for the carrying out of which operation inputs U0 and U1 are present, is provided for the case that single current subscribers are connected to the system. Again, the connection in question is determined by reason of an information about the hundred-one combination of the address (identification signal) and an information about the type of operation which is connected in operation control system OP with the remaining address portion.

The use according to the invention of the output code transducer ACW to carry out operations in the system connections of arriving as well as departing connections, moreover, offers advantageously the possibility of carrying out a continuous, i.e. routine-type, examination of the system connection unit and of the code transducer. For this purpose artificial requests are generated automatically in short intervals, internally, which are always transmitted by a central control - and evaluation circuit, not shown, if no genuine requests are present. For this purpose a blocking signal reaches all system connections SA prior to the carrying out of a supervision process, over input PS, in system connection unit SAE, which blocking signal prevents the forwarding of arriving genuine polarity changes for the duration of the supervision process. The supervision process then operates according to the principle that in the said control - and evaluation circuit at a specific system connection, a request is generated artificially which is used after the blocking of this specific system connection SA over input code transducer ECW in the described manner. The examination can then be restricted to a comparison of the previously determined address with the address determined by the input code transducer ECW. If the result is correct, the artificially generated request is again cancelled over output code transducer ACW, in that the specific system connection is set back to the previously existing condition. At the same time therewith, the general blocking for genuine requests is again cancelled at all system connections. In this manner all system connections and the related circuit complexes in the code transducer can be supervised in a continuously repetitive sequence. Within the framework of the invention, in order to foreclose a possible one-time disturbance, in the case of a false result, the examination can be repeated.

An arrangement of a system connection SA to carry out the invention is shown in FIG. 3. It has already been pointed out that in each case the system connections SA of the same ten (digit) within the selected code are combined to a system connection group SAG. If one selects, as in the instant example, a four-digit octal code for the connections, then a system connection group SAG in each case consists of eight system connections with the one-digits E0 to E7. System connection SA shown in FIG. 3 is, for example, that with address I0, H0, Z0, E0. The further system connections I0 H0, Z0 with the one-digits E1 to E7 result in the system connection group SAG, shown in system connection unit SAE of FIG. 2 at left. Such a system connection SA is assigned in each case to a transmitter ZL and a receiver AL. If a single current connection is in question, a further connection AN is present. For the evaluation of the request appearing on a transmitter ZL each system connection SA contains an evaluation circuit B, having a plurality of gate circuits, the output of which forwards the request signal to output AH over a mixer gate MA common to a system connection group SAG. At the same time, the request signal is also used for the preparation of outputs AZ and AE. With the proceeding of the first finding process, described with the aid of FIG. 2, in input code transducer ECW, the individual outputs AZ and AE forwarding the requests to the input code transducer are activated in the order of rank of the individual digits of the code. For this purpose the already mentioned forwarding inputs are present, FZ for activation of output AZ (for tens), and FE for activation of output AE (for ones).

To carry out the individual operations the system connection SA contains flip flop stages K1, K2 and K3 which are controllable over corresponding gates SR, SS and SU. Corresponding to their tasks the flip flop stages are designated as request flip flop stage K1, transmission flip flop stage K2, and repole flip flop stage K3. The inputs of the gates controlling the flip flop stages, the number of which corresponds to the number of operation types to be carried out, are connected with operation inlets R0, R1; S0, S1 and U0, U1. To carry out the operation "polarity interrogation," a further gate PG is available, which is connected with operation input PE, as well as with evaluation circuit B. All gates are connected over input HEE, over which an information about the address of the connection to be approached is available from output code transducer ACW in the form of the mentioned identification signal.

Considering the partial development selected for the working example of FIG. 2 there results the following mode of operation:

A polarity change arriving on transmitter ZL is conveyed to evaluation circuit B, compared there with the output potential of request flip flop stage K1, which corresponds to the previous condition of the transmitter line ZL, and conveyed over a gate AI to the mixer gate MA common for the system connection group SAG. By reason of the marking potential present at outputs AH, AZ, and AE, the address of the offering connection is determined in input code transducer ECW and communicated in binary form to transmission program control UEAS. For the interrogation of the connection offering a request the output code transducer ACW is, as already described, equipped with the binary address of this connection. After decoding, a part of the address, i.e. the part comprising all equal "ones" of a common hundred, is conveyed to input HEE, while the operation "polarity interrogation" reaches, over operation inlet PE, all system connections SA of a system connection group SAG, i.e. a group with equal 10" digit. Over gate PG, the new condition identified by the polarity change on transmitter line ZL is conveyed to an input of a mixer gate MP common to a system connection group SAG. Over the output of gate MP there is available at a common group output PA the polarity of the system connection SA determined by the entered address.

After the processing of the new polarity condition has taken place, the address of the transmitter is again sent to the output code transducer from transmission program control UEAS, while at the same time the operation "setting back" is issued over the operation control system OP. According to the polarity condition existing at this time on the transmitter line, either input RO or input R1 is equipped with the set-back signal, so that one of gates SR, depending what setting-back is in question, is opened and causes the request flip flop stage K1 to be switched into the appropriate position. This position then corresponds to the polarity condition existing on the transmitter line Z1.

To convey the polarity change to the receiver AL determined by the address contained in the central store, a portion of this address is connected in the described manner with the operation mode "transmit." Over the inlet HEE and one of inlets S0, or S1, the transmission flip flop stage K2 is controlled, by means of one of the gates SR, into a position which corresponds to the polarity change to be forwarded.

The controlling of the re-poling flip flop stage K3 also takes place in this manner, in that the address of the desired receiver and the operation "repoling" are transmitted from UEAS over one of inputs U0 or U1.

In the description of FIG. 2 it has been pointed out that with the aid of multiple utilization of the output code transducer ACW the examination processes can be carried out in simple manner. The already mentioned inputs PS is provided therefor. Over a blocking gate AS one of which is present per system connection SA, and which is approachable over inlet PS, the forwarding of a request offered by a transmitter is blocked in each system connection SA. From a not shown central control - and evaluation system, the address of a system connection SA is thereupon conveyed to transmission program control UEAS. At the same time, the operation "polarity interrogation" is transmitted. In the described manner the information about the polarity is thereupon given out over output PA. According to this polarity, the address is now transmitted with the operation "set back," whereby the request flip flop stage K1 is re-controlled in the approached system connection SA. In turn, through this, the evaluation circuit B which forms a comparator circuit with request flip flop stage K1 is activated, i.e., a request is thereby artificially generated. Simultaneously with the recontrolling of the request flip flop stage K1, the blocking is cancelled for this specific system connection, over blocking gate AS, so that the artificially generated request of this system connection — seen from the system — is evaluated as a genuine request and is found by input code transducer ECW in the described manner. Thus, there is available in the central supervision system the address, transmitted over the output code transducer ACW, and that found over the input code transducer ECW, of the selected specific system connection SA. Now, through comparison on one hand of the address emanating from central location with the address supplied by the finding process, the regular functioning of the system connection circuit, as well as the code transducer, can be supervised there. In case of an error it is possible to prevent the transmission of further request through blocking of output gates AH, AZ per system connection group SAG. In FIG. 3 this takes place over a further input S*p* (blocking).

With this examination process, for example proceeding as a cycle in each case, all system connections are reached. As according to the invention all system connections are blocked for genuine requests. It is guaranteed that only one examination request, i.e. only that emanating from the central control and evaluation system, becomes effective, and that the examination result supplies clear indications as to the type and the location of an error. A further advantage of the selected examination process resides in the fact that the supervision of the code transducer takes place in natural manner, i.e. the normal operational functions are accurately simulated, whereby no additional supervision circuits are required in the code transducer.

In a further development of the invention a mixer circuit CWHZ assigned to each system connection group can be assigned to the output code transducer ACW (see FIG. 2), and this mixer circuit supplies a signal at the address output of each system connection of this system connection group to an input BKE. Over a short circuit line assigned to a system connection group, the outputs BKA of that system connection group are combined in a mixer circuit, now shown, and are conveyed, for example to the central control - and evaluation system. A test is possible as to whether an addressed component group is existing at all, i.e., is "plugged-in" in the partial development.

It has already been pointed out that the working example of FIG. 2 represents only a partial development of the system with regard to the code selected for the connections. For an expansion thereof, certain previously discussed possibilities exist, which are not in derogation of the stated advantages of the process according to the invention. For example, further mixed circuits can be provided in the input code transducer and the remaining inputs of the thousand- and hundred-finder chains can be connected. However with an increasing number of connections, the demands on the time conditions of the code transducer will continue to increase, and if operation takes place on individual connection lines with higher transmission speeds, the maintaining of pre-determined time conditions in the code transducer is an absolute necessity, because each delay in the selection - and interrogation process means an increase in the distortion.

For the foregoing reason the possibility, for example, through a change of the selected code, of increasing the number of the lines which can be connected can cause considerable disadvantages which will adversely influence the quality of message transmission. It is possible, however, within the scope of the invention to considerably increase the number of connections and still keep within the required time conditions.

In this connection it is contemplated by the invention to form several groups of system connection units and to assign to each system connection unit group in each case a code transducer described above. Each code transducer assigned to a system connection unit group thereby operates according to the principle which forms the basis of the invention, i.e. the part of the code transducer forming the output code transducer takes over, at the same time, selection - and processing in accordance with the address conveyed thereto and mode of operation. For the interrogation of the individual code transducers an additional finder group system is provided over which the input code transducers, operating independently, are determined and interrogated. This finder group system can operate according to the previously mentioned finder chain principle.

Figures 4, 4A, 4B:
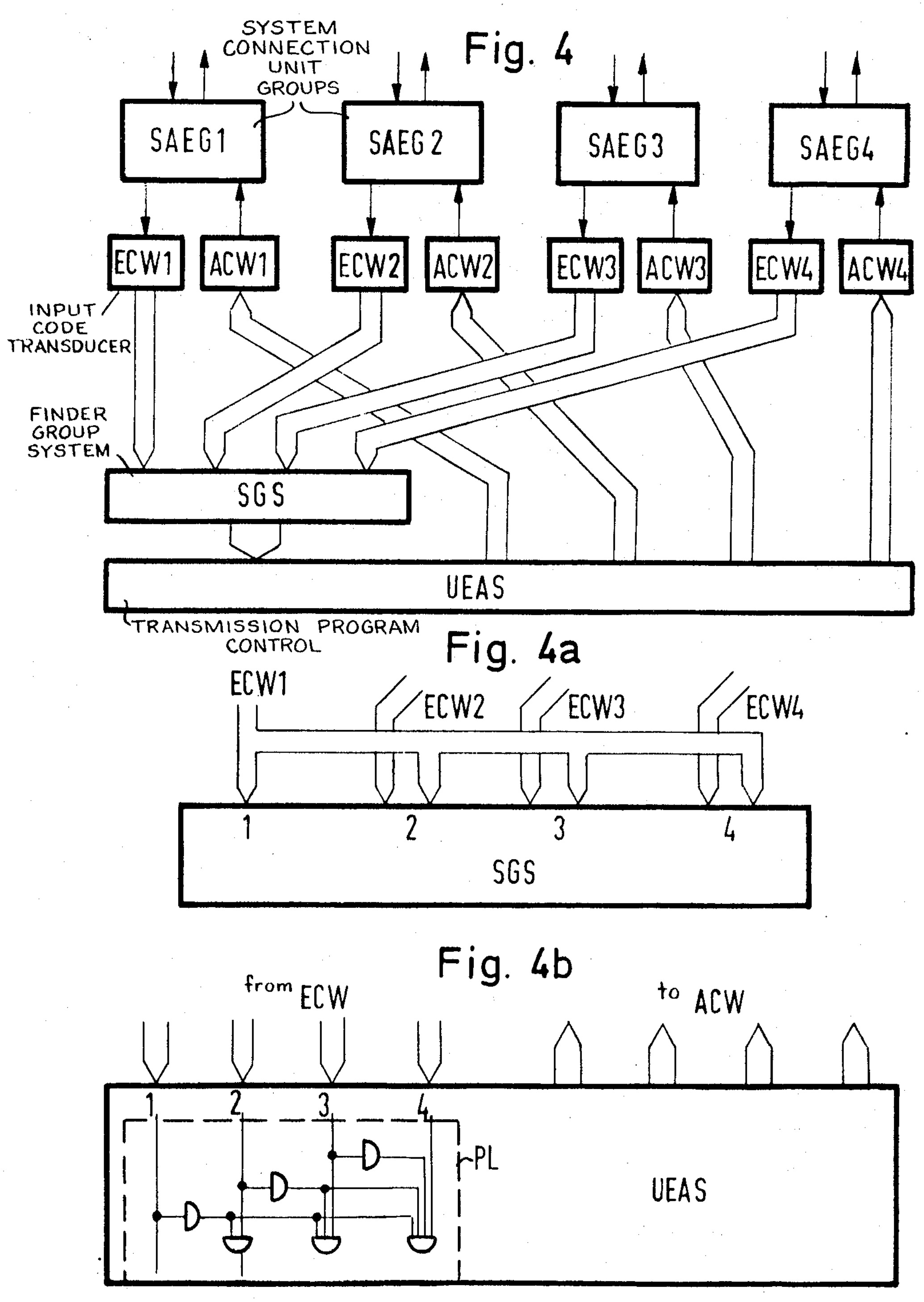
FIGS. 4, 4*a* and 4*b* illustrate in block diagram form alternatives to the FIG. 2 system.

A working example of this alternative form of the invention is shown in FIG. 4. In each case a code transducer with one input code transducer ECW1 to ECW4 each, and one output code transducer ACW1 to ACW4 each, is assigned to a system connection unit group SAEG1 to SAEG4. The outputs of the input code transducers are scanned over the finder group system SGS for request transmissions. The result of the finding process is available over the transmission program control UEAS to the central store in the manner described. The operation modes, for example the operations "-polarity interrogation," "transmission," "setting back" and "repoling," take place with the aid of the output code transducer ACW1 to ACW4 in each case in a manner also described.

Because all input code transducers operate independently from one another, there results a considerable decrease in the average processing time for each individual request. Moreover, a further advantage in that the system can be expanded without interruption of operation results.

In addition the foregoing development of the system has also the advantage that the requests offered by the individual transmitters can be processed according to specific priorities. FIGS. 4*a* and 4*b* show two possibilities of a priority-dependent selection of a system connection unit.

In FIG. 4*a*, for example, all requests offered by input code transducer ECW1 are treated in privileged manner. In this embodiment a priority-dependent selection is thus achieved through the connection of the input terminals of input code transducer ECW1 to the first inputs of the finder chains forming the finder group system SGS in each case. Another possibility for a priority-dependent selection is shown in FIG. 4*b* in which a priority logic already present in the transmission program control UEAS is utilized. If the latter form is selected, finder group system SGS can also be eliminated.

The embodiments of the invention and process descriptions thereof set forth hereinabove are considered to be only exemplary, and it is contemplated that changes and modifications may be made thereto within the scope of the appended claims.

We claim:

1. A process for the exchange of pulse coded messages between connections within line connection units in dial exchange data systems having programmable, central control means, wherein connections are established between incoming and outgoing connections according to the principle of request and proceed to send, and utilizing data and programs contained in a central storage means, and wherein the identification of incoming connections takes place in an input code transducer and the identification of outgoing connections takes place in an output code transducer, comprising the steps of:

identification, by said input code transducer, of an incoming connection transmitting a request, said input code transducer utilizing binary address information for performing said identification, transmission of said request to a predetermined portion of said central storage means, said portion being determined by said address information, addressing an outgoing connection utilizing information previously stored in said central storage means by means of said output code transducer, and completing, by a logical connection step, an appropriate connection as determined by the address information to provide a desired one of a plurality of predetermined modes of operation simultaneously with the occurrence of the steps hereinabove.

2. The process defined in claim 1, wherein said logical connection step is carried out using a complete decoded address of a system connection.

3. The process defined in claim 1, wherein said logical connection step is carried out using only a part of the address of a system connection, the remainder of said address information being used for identification of a connection.

4. The process defined in claim 1, comprising the additional steps of:

generating internally a blocking signal for blocking all system connections from forwarding incoming connections, evaluating in said output code transducer the address of a system connection, interrogating the polarity condition of said output code transducer and, using the result of said interrogation for the transmission of a signal indicating the setting back operation mode over the system connection with said address and thereby causing in the system connection the appearance of an artificially generated request, while said blocking for the system connection, the address of which has been evaluated, is cancelled.

5. Apparatus for the exchange of pulse coded messages between connections within line connection units in dial exchange data systems having programmable, central control means, wherein connections are established between incoming and outgoing connections according to the principle of request and proceed to send, and utilizing data and programs contained in a central storage means and having an input code transducer for identifying incoming connections and an output code transducer for identifying outgoing connections, comprising:

means in said input code transducer for identifying an incoming connection transmitting a request by means of binary address information, means in said output code transducer for addressing an outgoing connection using information previously stored in said central storage means, a plurality of means for generating a plurality of operating modes and logical connection means for connecting according to the address information the corresponding system connection to provide a desired one of said plurality of operating modes simultaneously with the operations of the input and output code transducers described hereinabove.

6. The apparatus defined in claim 5 wherein said output code transducer includes a decoding circuit means for decoding the binary address of a connection received from said central storage means, an operational control system and a plurality of mixer circuits, the number of which corresponds to the code selected for the connections used, said apparatus further comprising:

a plurality of system connection groups into which said system connections assigned to each connection are combined, said system connection groups each having a plurality of operation mode inputs to said operation control system, and a plurality of identification inputs for each of said system connections connected to a mixer circuit for evaluating a portion of said binary address information, a coincidence being formed among a selected type of operation mode and an address part common to the system connection to be selected and interrogated and said identification inputs.

7. The apparatus defined in claim 6, wherein one of said operation mode inputs is adapted to carry out a polarity interrogation operation, said one input being reached only by said operational control system through the address portion supplied by said output code transducer, another of said inputs to said operation modes being addressable in a time-dependent manner.

8. The apparatus defined in claim 6, wherein:

each of said system connections includes an evaluation circuit means for the evaluation of polarity changes appearing at the inputs thereto, and a plurality of gates per operation mode which are addressable over an operation mode input and said identification inputs.

9. The apparatus defined in claim 8, wherein said evaluation circuit means and a request flip flop stage form a comparison circuit for generating an output impulse only when said comparison circuit senses a logic level deviating from the level of said request flip flop stage.

10. The apparatus defined in claim 9, wherein said plurality of said operation modes includes a setting back operation mode, said setting back mode being generated as a result of the interrogated polarity in such a way that the request is cancelled only when said signal for carrying out said setting back mode corresponds to the polarity at the input of said evaluation circuit.

11. The apparatus defined in claim 10 having outputs from said system connection groups for transmission of requests and means for blocking said outputs when an error is determined through address comparison.

* * * * *